(12) United States Patent
Wilson

(10) Patent No.: US 7,955,501 B2
(45) Date of Patent: Jun. 7, 2011

(54) FLOATING FILTER HOLDER

(76) Inventor: Kelce Steven Wilson, Murphy, TX (US)

( * ) Notice: Subject to any disclaimer, the term of this patent is extended or adjusted under 35 U.S.C. 154(b) by 0 days.

(21) Appl. No.: 12/819,196

(22) Filed: Jun. 19, 2010

(65) Prior Publication Data

US 2010/0252493 A1    Oct. 7, 2010

Related U.S. Application Data

(63) Continuation of application No. 11/650,057, filed on Jan. 5, 2007, now Pat. No. 7,767,087.

(51) Int. Cl.
*B01D 35/30* (2006.01)
*B01D 24/20* (2006.01)

(52) U.S. Cl. .................. 210/120; 210/502.1; 210/242.1; 210/282; 210/455; 210/472; 210/473; 210/477; 210/482; 210/232

(58) Field of Classification Search .................. None
See application file for complete search history.

(56) References Cited

U.S. PATENT DOCUMENTS

| | | | |
|---|---|---|---|
| 593,333 A | 11/1897 | Park | |
| 1,669,284 A | 5/1928 | Chetham | |
| 2,084,005 A | 6/1937 | Richards | |
| 3,318,450 A | 5/1967 | Watson et al. | |
| 3,409,165 A | 11/1968 | Creith | |
| 3,747,767 A | 7/1973 | Hankammer | |
| 3,945,928 A | 3/1976 | Ayres | |
| 4,151,092 A | 4/1979 | Grimm et al. | |
| 4,205,766 A | 6/1980 | White | |
| 4,306,971 A | 12/1981 | Hankammer | |
| 4,666,600 A | 5/1987 | Hankammer | |
| 4,764,274 A | 8/1988 | Miller | |
| 4,860,491 A | 8/1989 | Panuski | |
| 4,867,880 A | 9/1989 | Pelle et al. | |
| 4,895,648 A | 1/1990 | Hankammer | |
| 4,917,801 A | 4/1990 | Luderer et al. | |
| 4,951,848 A | 8/1990 | Keller | |
| 4,969,996 A | 11/1990 | Hankammer | |
| 5,038,793 A | 8/1991 | Guirguis | |
| D323,874 S | 2/1992 | Hirman et al. | |
| 5,178,305 A | 1/1993 | Keller | |
| 5,448,854 A | 9/1995 | Hirsch et al. | |
| 5,536,396 A | 7/1996 | Mudra et al. | |
| 5,562,824 A | 10/1996 | Magnusson | |
| 5,632,895 A | 5/1997 | Tsukagoshi et al. | |
| 5,632,905 A | 5/1997 | Haynes | |
| 5,637,214 A | 6/1997 | Kahana | |
| 5,989,424 A | 11/1999 | Serenko et al. | |
| 6,202,541 B1 | 3/2001 | Cai | |
| 6,238,552 B1 | 5/2001 | Shannon | |
| 6,405,875 B1 | 6/2002 | Cutler | |

(Continued)

*Primary Examiner* — Robert James Popovics
(74) *Attorney, Agent, or Firm* — Kelce S. Wilson

(57) ABSTRACT

A system and method are disclosed for filtering liquid using a filter platform that is not rigidly affixed to a container containing the liquid to be filtered. The platform may be buoyant so that as liquid flows from one side of the platform, through a filter, and then to the other side of the platform, the platform may move, thus reducing the volume of a container or portion of a container that holds the unfiltered liquid. Alternatively, the platform may be heavier than the liquid to be filtered, may be either set in place on a support structure or else set on top of unfiltered liquid and allowed to sink downward as liquid is filtered. The system may further comprise a flexible membrane that allows two sections of liquid to be separated, even while the platform is moveable.

5 Claims, 3 Drawing Sheets

U.S. PATENT DOCUMENTS

| | | |
|---|---|---|
| 6,409,528 B1 | 6/2002 | Bodnar |
| 6,471,069 B2 | 10/2002 | Lin et al. |
| 6,524,477 B1 | 2/2003 | Hughes |
| 6,953,523 B2 | 10/2005 | Vandenbelt et al. |
| 7,077,273 B2 | 7/2006 | Ellsworth et al. |
| 7,374,678 B2 | 5/2008 | Leach et al. |
| 7,438,799 B2 | 10/2008 | Vandenbelt et al. |
| 7,445,125 B2 | 11/2008 | Ellsworth et al. |
| 7,544,294 B2 | 6/2009 | Halterman |
| 7,547,272 B2 | 6/2009 | Ellsworth et al. |
| 7,678,282 B2 | 3/2010 | Moretto |
| 7,767,087 B2 * | 8/2010 | Wilson .......................... 210/249 |
| 2006/0151384 A1 | 7/2006 | Ellsworth et al. |
| 2007/0068393 A1 | 3/2007 | Nosler et al. |
| 2008/0057505 A1 | 3/2008 | Lin et al. |
| 2008/0164223 A1 * | 7/2008 | Wilson .......................... 210/780 |
| 2008/0206757 A1 | 8/2008 | Lin et al. |
| 2009/0120852 A1 | 5/2009 | Ellsworth et al. |
| 2009/0127178 A1 | 5/2009 | Kuo |
| 2009/0152286 A1 | 6/2009 | Wilson |
| 2009/0238725 A1 | 9/2009 | Ellis et al. |
| 2010/0252493 A1 * | 10/2010 | Wilson .......................... 210/232 |

* cited by examiner

FLOATING FILTER HOLDER

RELATED APPLICATIONS

This is a continuation of U.S. patent application Ser. No. 11/650,057, filed Jan. 5, 2007 now U.S. Pat. No. 7,767,087, and claims priority thereto.

TECHNICAL FIELD

The invention relates generally to filtering devices, and more particularly, to liquid filtration and purification systems.

BACKGROUND

Commercially available drinking water filtration devices, such as pitchers or water dispensers from Pur and Brita, use containers which are arranged into two sections. A top section holds water before it is filtered, and a bottom section hold the filtered water. To use one of the devices, a replaceable carbon cartridge filter is placed in an approximately round hole in a barrier which separates the container into two approximately equal volumes. The two volumes are stacked vertically. Water is poured into the upper volume and gravity draws the water through the filter to the lower section. Drinking water is then drawn from the lower section.

Unfortunately, the devices are less than 50% volumetric efficient. That is, less than 50% of the total interior volume of the container is available for holding the filtered liquid. This is primarily because the holding volume for the unfiltered water is the same size as that of the holding volume for the filtered water, and the filter itself also takes up interior volume. Another shortfall of the commercially available filtration pitchers and water dispensers is that the design for their intended use, i.e. inside a refrigerator, makes them too fragile for many applications such as filtering drinking water at construction sites. Yet another shortfall is the limitation of the daily filtering capacity of the replaceable carbon filters. The commercially available carbon filters are often limited to filtering only a few gallons of water per day, and may take several minutes to filter even a single gallon of water.

Other water containers, such as the widely-used 10-gallon water cooler from Igloo, are well suited to rugged environments. Due to their size, these large water coolers are often filled from garden hoses or outdoor faucets, which may not produce the best-tasting or cleanest water. Filling a 10-gallon water cooler using filtered water from a Pur or Brita pitcher or dispenser is impractical in many situations, due to the filtration time and the need to cycle several full pitchers to fill a single 10-gallon cooler. Ironically then, the rugged environments in which carbon filter cartridges may be the most appreciated are the ones lacking a cost-effective system for using the filters in a ubiquitous container.

SUMMARY

A filter platform that can hold a filter does need not be rigidly attached to a container, but rather may be temporarily placed in the container to act as a barrier between the unfiltered liquid and filtered liquid. Multiple holes in the filter platform allow for the use of multiple filters in parallel, speeding the filtration time for large volumes of liquid, and reducing the load on each individual filter cartridge. Because the filter platform is not rigidly attached to the container, it may move as liquid flows from the top side, through one of the filters, to beneath the filter platform. If the platform is buoyant, it will float upward as liquid builds beneath it. Because of variations in the internal dimensions of common water coolers, there may be a gap between the edge of the platform and the inner walls of the container. A flexible membrane, such as a plastic sheet, an inflatable ring, a gel ring, or another sealing mechanism may reduce the amount of unfiltered liquid passing from above to beneath the platform and bypassing the filters.

A buoyant filter platform may be susceptible to tipping as it floats, which is undesirable. Additionally, since the carbon filter cartridges themselves may not be buoyant, the filter platform may require additional buoyancy. Further, the filter cartridges themselves will generally extend from the bottom side of the platform, and it may not be desirable allow the weight of unfiltered liquid to be borne by the water filters. Downward projections from the filter platform may address all three challenges simultaneously. First, as the filter holder begins tipping, the downward projections will press against the side wall of the container to limit any tipping motion. Second, the downward projections may offer additional buoyancy to help overcome the weight of the filters. Also, the downward projections act as an initial support structure to hold the weight of the filter assembly and liquid above it, until enough liquid passes beneath the filter platform that it begins to float.

Embodiments of the invention then allow for the filtration of human potable liquid, such as drinking water. Embodiments of the invention do not require that the platform arrangement is buoyant, or that it moves. Some embodiments of the invention may include a platform that is merely temporarily set inside a container, resting on one or more downward projections that form a support structure to hold the filter platform at a position above the floor of the container. In such a situation, buoyancy may be undesirable, and the downward projections may offer additional weight to keep the filter platform stable. Embodiments of the invention may comprise approximately round filter platforms, sized to fit the inside of water coolers and having approximately round holes, sized to accommodate a commercially-available replaceable carbon cartridge filter. Methods for using a floating filter holder include filtering liquid within a container as well as filtering a contaminated volume of liquid localized within in a larger volume of liquid, such as cleaning up an oil spill in a lake.

The foregoing has outlined the features and technical advantages of the invention in order that the description that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the invention.

BRIEF DESCRIPTION OF THE DRAWINGS

For a more complete understanding of the invention, reference is now made to the following descriptions taken in conjunction with the accompanying drawings, in which.

DETAILED DESCRIPTION

Figure 1:
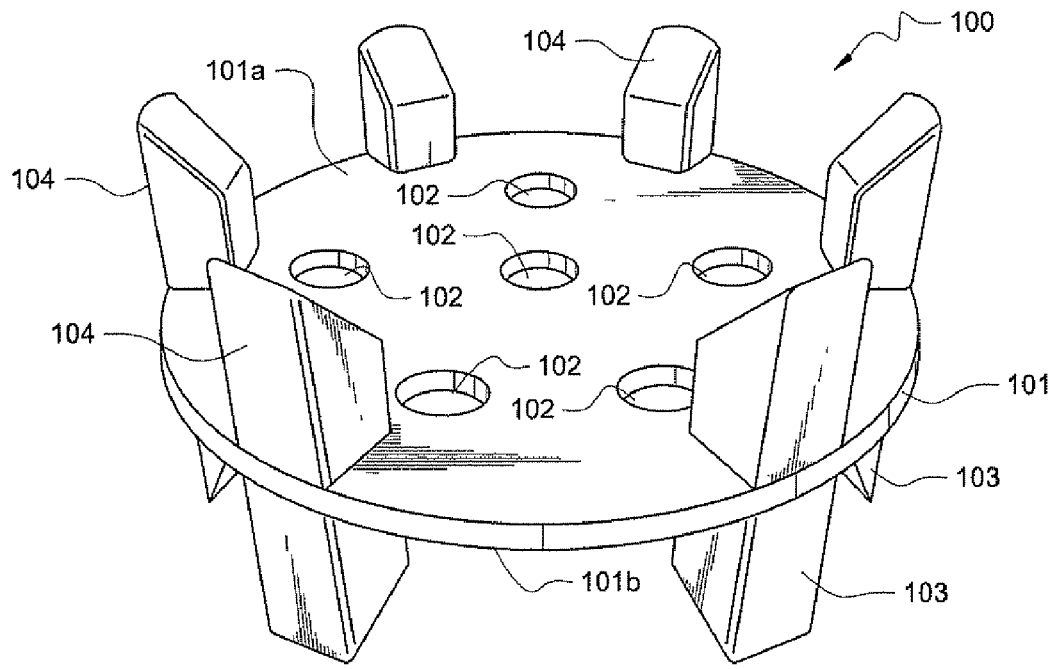
FIG. 1 shows an embodiment of a floating filter holder.

FIG. 1 shows floating filter holder 100, comprising filter platform 101, which has top side 101a, bottom side 101b, and holes 102. Filter platform 101 is shown as approximately round, which will enable floating filter holder 100 to fit inside common cylindrical drinking water coolers. Holes 102 are round and may be sized to accommodate a commercially-available replaceable carbon cartridge filter, such as one from Pur or Brita. However, it should be understood that other shapes and sizes of filter platform 101 and holes 102 may be used. Further, while the figure shows six holes 102, it should be understood that more or fewer may be provided. The benefits of using a large number of holes include improved filtering speed, since more filters may be used simultaneously, and also that the filtering load on each filter is reduced.

Floating filter holder 100 also comprises downward projections 103 and upward projections 104. Downward projections 103 may perform up to three functions simultaneously: 1) Downward projections 103 provide a support structure to hold filter platform 101 above the floor of a container. 2) Downward projections 103 may provide additional buoyancy if filter holder 100 is intended to float upward as liquid is filtered, or else may provide additional weight if filter holder 100 is intended to remain in place. 3) Downward projections 103 may provide tip resistance by pressing against the sidewall of a container to preventing further tipping motion. Although multiple downward projections are illustrated, it should be understood that a single, ring-shaped downward projection may be used. For example, each of downward projections 103 may be widened to the point that they merge, forming a single ring projecting downward along the circumference of filter platform 101.

Upward projections 104 may perform up to five functions simultaneously: 1) Upward projections 104 provide a stand-off structure to prevent the top of a filter from contacting the underside of a container lid. 2) Upward projections 104 may provide additional buoyancy if filter holder 100 is intended to float upward as liquid is filtered, or else may provide additional weight if filter holder 100 is intended to remain in place. 3) Upward projections 104 may provide tip resistance by pressing against the sidewall of a container to preventing further tipping motion. 4) Upward projections 104 provide a signaling means to indicate that water filtration is nearly complete, such as by providing a visual indication as they break above the surface of a liquid or possibly trigger a signaling device. 5) Upward projections 104 provide a location for a snap ring to couple a flexible membrane to filter platform 101. The use of a flexible membrane is discussed below in the description of FIG. 2. Although multiple upward projections are illustrated, it should be understood that a single, ring-shaped upward projection may be used.

Figure 2:
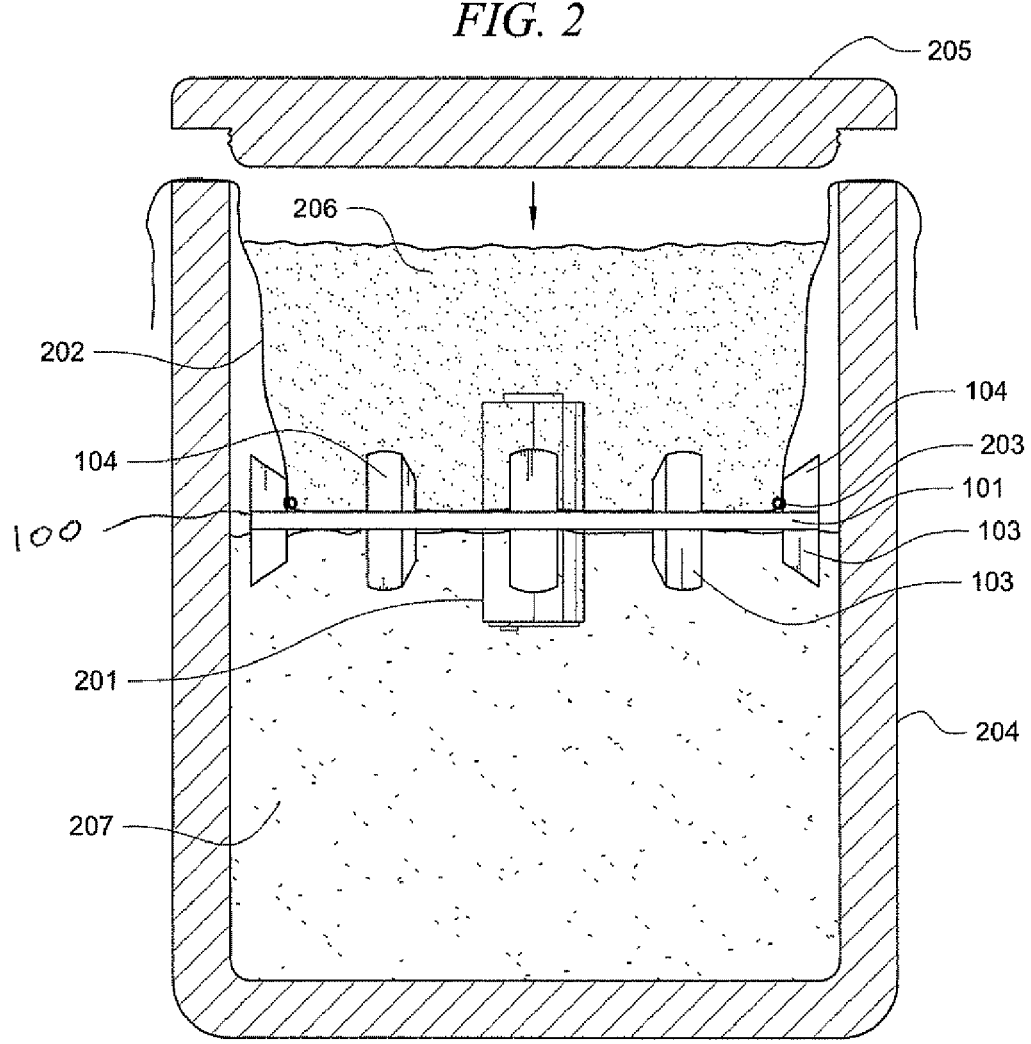
FIG. 2 shows an embodiment of a floating filter holder within a container.

FIG. 2 shows floating filter holder 100 in use within container 204. Filter 201 has been placed in one of the holes 102 of floating filter holder 100. Other holes 102 may also have filters 201 installed, or may be covered with plugs or part of membrane 202. Membrane 202 is attached to floating filter holder 100 by the use of snap ring 203 set in place near where the base of upward projections 104 extend from platform 101. The other end of membrane 202 is held in place by friction between lid 205 and container 204. It should be understood that other means for attaching a membrane 202 to filter holder 100 may be used, and that membrane 202 may be made from any materials suitable for producing a flexible bather. For example, membrane 202 may be a plastic sheet or a common trash bag with the bottom cut out.

Filter 201 is shown in a large size for easy viewing, and is not necessarily drawn to scale. It may be desirable to have downward projections 103 longer than the distance that filter 201 extends below platform 101. This way, when filter platform 100 is set on the floor of container 204, the weight of unfiltered water 206 will rest on downward projections 103, rather than on filter 201.

In order to use floating filter holder 100 to filter a liquid, a user first inserts one or more filters 201 into holes 102, and ensures that any holes 102 that do not have a filter 201 are otherwise plugged or covered. Membrane 202 is attached to floating filter holder 100 by setting membrane 202 on platform 101, and setting snap ring 203 at the base of upward projections 104. Floating filter holder 100 is then set inside container 204, at the bottom. The free end of membrane 202 is pulled to the top of container 204, and draped over the outside, similar to the way a plastic trash bag liner is set in a trash can.

With the assembly in place, unfiltered water 206 is poured on top of floating filter holder 100, and lid 205 is set on container 204, which helps hold membrane 202 in place. Unfiltered water 206 passes through filter 201 and flows beneath platform 101, thus becoming filtered water 207. Floating filter holder 100 is able to float upward due to its buoyancy and the presence of filtered water 207 beneath. Alternatively, if floating filter holder 100 moves by other means apart from buoyancy, such as mechanical means, floating filter holder 100 could move in another direction besides upwards. For example, if floating filter holder 100 was used in a horizontal configuration, it could move laterally or downward by the use of cables. Further, if a container had unfiltered liquid already in it, and floating filter holder 100 was heavier than the liquid, it could be set on top of the unfiltered liquid, and as it sank to the bottom, liquid would be forced through the filters. The filtered liquid could then be poured off from above floating filter holder 100.

Figure 3:
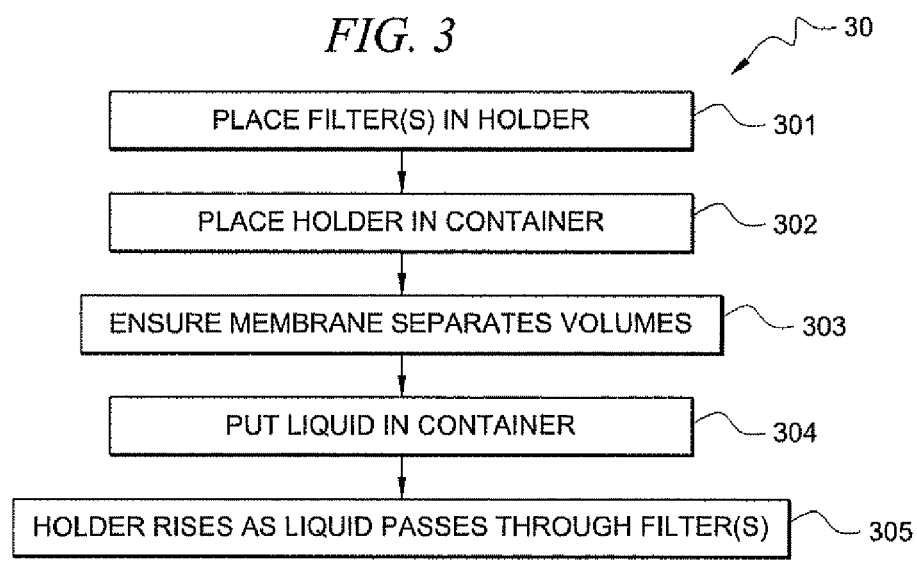
FIG. 3 shows a method for using a floating filter holder in a container.

FIG. 3 shows method 30 for using floating filter holder 100 in container 204. In process 301, filter 201 is placed in filter holder 100, and the assembly is placed in container 204 during process 302. In process 303, membrane 202 is arranged such that it seals any gaps between platform 100 and container 204. Unfiltered water 206 is poured into container 204 during process 304, and filter holder 100 rises as unfiltered water passes through filter 201 in process 305. During process 305, the volume of container 204 that is below platform 101 increases, while the volume of container 204 above platform 101 decreases. Thus, process 305 makes container 204 more volumetrically efficient than a standard Pur or Brita container, even though container 204 was not designed for use with a Pur or Brita filter. FIG. 2 reflects a scenario in which process 305 is slightly more than half-way complete.

Figure 4:
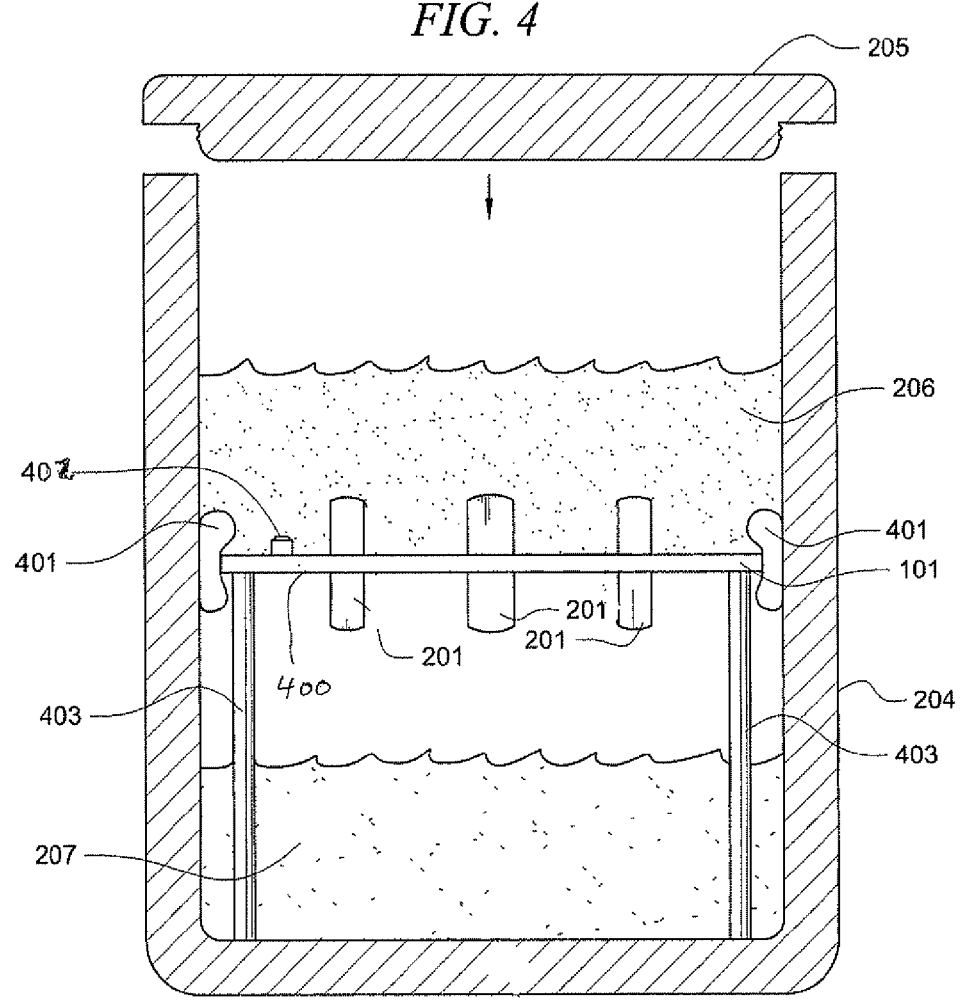
FIG. 4 shows another embodiment of a filter holder within a container.

FIG. 4 shows an embodiment of a filter holder 400 within container 204. Filter holder 400 is not rigidly attached to container 204, and is not buoyant. It may be used with a modified version of method 30, in which process 305 is deleted. Filter holder 400 uses inflatable ring 401 to seal a gap between platform 101 and container 204. It should be understood, though, that alternative flexible gasket-like structures may be used, such as a gel-filled ring. It should also be understood that a gasket-like structure may be used with floating filter holder 100 shown in FIG. 2, and that a membrane 202 may be used with a filter holder that is otherwise similar to filter holder 400.

Filter holder 400 is set on the floor of container 204, resting on downward projections 403. Downward projections 403 comprise a support structure to hold platform 101 in place approximately mid-way up in container 204. This allows the maximum volume efficiency when the unfiltered and filtered sections of container 204 are the same size. Further, downward projections 403 may be weighted to keep filter holder 400 in place. FIG. 4 shows three filters 201, and also indicates that approximately half of unfiltered water 206 has become filtered water 207. As the volume of filtered water 207 grows, it will displace air beneath platform 101. Thus, a pressure release valve 402 is provided in order to allow air to escape from beneath platform 101.

Figure 5:
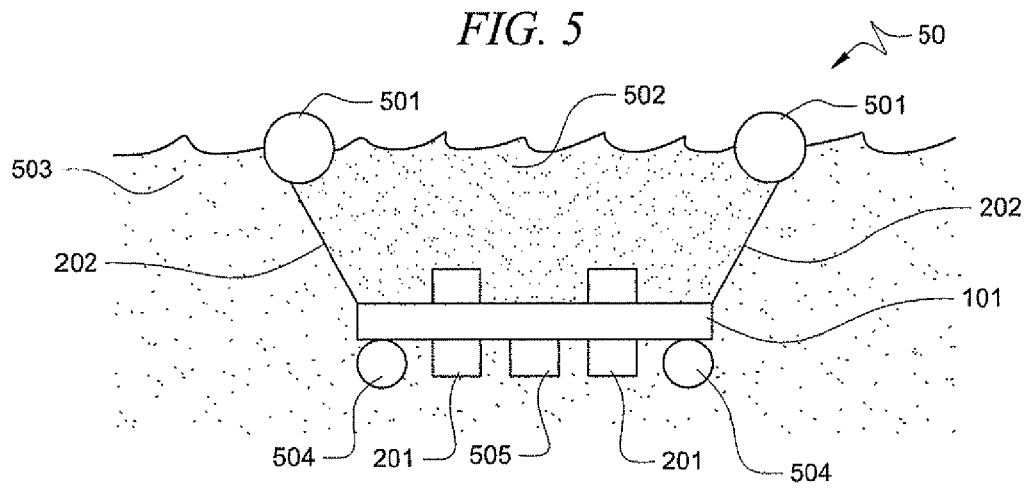
FIG. 5 shows an embodiment of a floating filter holder that may be used without a container.

FIG. 5 shows an embodiment of a floating filter system 50 that may be used without a container. That is, filter system 50 uses floating barrier 501, membrane 202, and platform 101 to form a barrier between contaminated liquid 502 and cleaner liquid 503. System 50 may be used to clean up localized contamination in a larger body of water, such as an oil spill in an ocean or a lake. Initially, contaminated liquid 502 is at least partially surrounded by cleaner liquid 503, although if contaminated liquid 502 is at the surface of a body of water, it has air above, and is thus not entirely surrounded by cleaner liquid 503. Floating barrier 501 may be initially placed on the surface of cleaner liquid 503 in order to surround contaminated liquid 502, at a division of contaminated liquid 502 and cleaner liquid 503, or if the volume of contaminated liquid 502 is too large to be surrounded by floating barrier 501, then on top of the surface of contaminated liquid 502. If the volume of contaminated liquid 502 is too much to be contained by system 50, contaminated liquid 502 may need to be filtered in sections.

Two filters 201 are shown in platform 101, which is beneath contaminated liquid 502. Membrane 202 helps contain contaminated liquid 502 because it is connected to both platform 101 and floating barrier 501. Initially, platform 101 might not be buoyant enough to float at the surface of contaminated liquid 502. However, once system 50 is set up, buoyancy tanks 504 may be filled with a gas so that platform 101 begins to float upward. This motion will then use gravity to force contaminated liquid 502 through filters 201. Buoyancy control 505 keeps platform 101 level and controls the ascent. Cables or tension in membrane 202 can supplement buoyancy effects to help raise platform 101, if platform 101 is not sufficiently buoyant.

Figure 6:
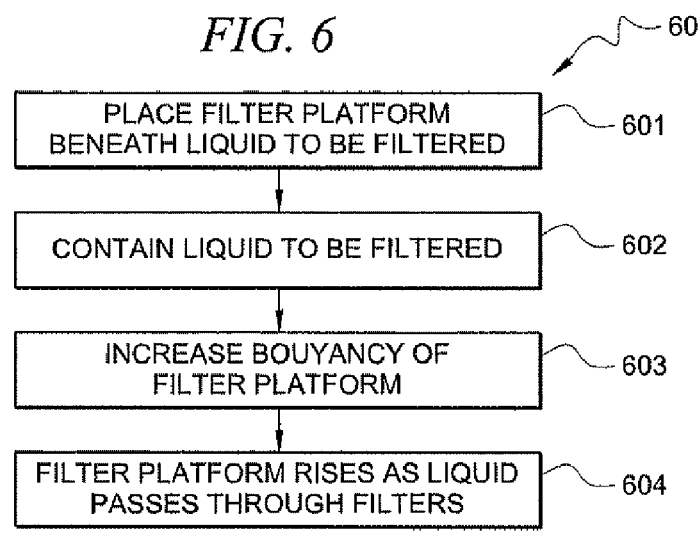
FIG. 6 shows a method for using a floating filter holder without a container.

FIG. 6 shows method 60 for using floating filter system 50. In process 601, platform 101 holding one or more filters 201 is placed beneath contaminated liquid 502. In process 602, membrane 202 and floating bather 501 are set in place to surround and contain contaminated liquid 502, so that the primary exit path for contaminated liquid 502 is through filters 201. The buoyancy of platform 101 is increased by pumping air or another suitable material into buoyancy tanks 504 in process 603. Process 603 is controlled, at least in part, by buoyancy control 505. Platform 101 then rises due to the increased buoyancy in process 604, as contaminated liquid 502 passes through filters 201, thereby being cleaned.

As an alternative, liquid may also be filtered with a sinking platform, similar in concept to the embodiment described above for a platform inside a container. For a sinking platform in an open body of water, though, the unfiltered liquid should be constrained so that it must pass through the filters 201. Once the filters have trapped contaminants, the filter platform and associated parts may be retrieved. For example, referring again to FIG. 5, contaminated liquid may contain a contaminant, such as oil, which floats on the top of water. Thus, the contaminant is unlikely to sink far below the surface on its own.

Floating bather 501 may be placed on the surface of contaminated liquid 502 or on the surface of cleaner liquid 503, just outside contaminated liquid 502. The area inside floating barrier 501 is then covered by membrane 202 and platform 101. That is, for a downward filtration, platform is placed above contaminated liquid 502, rather than beneath. Floating barrier 501 then sinks, either by having its buoyancy reduced, or by mechanical action such as cables pulling it downward. Alternatively, floating barrier 501 could be heavier than cleaner liquid 503 so that it sinks on its own when it is lowered by slackening cables, or else is assembled under water and membrane 202 is then routed to the surface of contaminated liquid 502 to attach to platform 101. Whatever means may be used that result in floating barrier 501 sinking or remaining under cleaner liquid 503, once it has begun sinking, contaminated liquid 502 is trapped by a combination of membrane 202, platform 101 and the buoyancy of the contaminant. Membrane 202 then pulls platform 101, if platform 101 doesn't sink on its own. The buoyancy of the contaminant then forces contaminated liquid 502 upward through filters 201.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A device for filtering liquids, said device comprising:
an approximately round filter platform comprising at least one approximately round hole, sized to accommodate a two-inch diameter cylindrical replaceable carbon cartridge filter,
wherein the filter platform is not rigidly affixed to a container containing liquid to be filtered,
wherein the filter platform is adapted to provide a barrier between unfiltered liquid and filtered liquid, and
wherein the filter provides a path for a liquid to flow, under force of gravity, from a first side of the filter platform to a second side of the filter platform, such that the filtered liquid is human potable;
a flexible membrane, wherein the flexible membrane is coupled to the filter platform and is adapted to seal a gap between the filter platform and a container; and at least one downward projection from the second side of the filter platform, wherein the downward projection is adapted to hold the filter platform above a floor of a container, wherein the filter platform is buoyant in the liquid, and wherein the filter platform is configured to float upward as the liquid passes through the filter.

2. The device of claim 1 further comprising:

a pressure relief valve, adapted to enable air to escape from beneath the second side of the filter platform as the liquid passes through the filter.

3. The device of claim 1 wherein said flexible membrane comprises an inflatable or gel-filled ring.

4. The device of claim 1 further comprising:

at least one upward projection from the first side of the filter platform, wherein the upward projection is adapted to prevent tipping of the filter platform by engaging a sidewall of the container.

5. The device of claim 1 wherein the downward projection is further adapted to prevent tipping of the filter platform by engaging a sidewall of the container.

* * * * *